United States Patent Office 2,907,732
Patented Oct. 6, 1959

2,907,732

POLYCARBOXYLIC ACID, EPOXIDE COMPOSITIONS AND ALDEHYDE CONDENSATE MODIFICATIONS THEREOF

Sylvan Owen Greenlee, West Lafayette, Ind., assignor to S. C. Johnson & Son, Inc., Racine, Wis.

No Drawing. Application October 2, 1958
Serial No. 764,771

8 Claims. (Cl. 260—19)

This invention relates to new products and compositions resulting from the reaction of polyepoxides with polycarboxylic acids and the modification of such compositions with aldehyde condensates to produce compositions useful in the manufacture of varnishes, molding compositions, adhesives, films, etc. The invention includes initial reaction mixtures as well as intermediates and final reaction compositions and methods for their production.

It is an object of this invention to produce new compositions of matter from polycarboxylic acids and polyepoxides with or without modification with aldehyde condensates which are suitable for use in coatings, moldings, adhesives, etc.

Another object of the invention is the production of intermedaite reaction compositions of polyepoxides and polycarboxylic acids with or without modification with aldehyde condensates which are capable of further reaction on the application of heat to form infusible, insoluble products.

Another object of this invention is the production of new reaction mixtures as described above which are stable at ordinary temperatures for long periods of time and which may be converted into insoluble, infusible products by the application of heat with or without the addition of catalyst.

Other objects of the invention will appear from the following more detailed descriptions with particular reference to the specific illustrative examples.

In general the polyepoxides contemplated for use herein are compounds containing an average of more than one and up to about 20 epoxide groups per molecule. Epoxide groups for the purpose of this specification refer to groups wherein the epoxy oxygen bridges adjacent carbon atoms or oxirane groups. Such compositions, free from functional groups other than epoxide, carboxyl and hydroxyl, are reactive with active hydrogen containing groups including the phenolic and carboxyl groups supplied by the polycarboxylic acids herein contemplated. Typical epoxides which have been found to be operable are complex resinous polyepoxides, resinous polyepoxide polyesters, epoxidized natural oils and aliphatic polyepoxides.

The polycarboxylic acids contemplated for use herein are polyethers of 4,4 bis(hydroxyaryl) pentanoic acids and aliphatic coupling agents of 2–10 carbon atoms with said coupling agents containing at least two functional groups reactive with an aryl-hydroxyl to form an ether linkage therewith.

The aldehyde condensates are prepared from low molecular weight aldehydes and ammonia derivatives capable of being condensed with an adlehyde or from low molecular weight aldehydes and phenols capable of being condensed with an aldehyde. It is necessary that the condensate remain soluble and fusible as well as contain reactive methanol groups or some other form of active hydrogen.

The compositions of the instant invention are thus prepared by reacting an epoxide with a resinous polycarboxylic acid and if desired modifying said composition with the before-mentioned aldehyde condensates. Having generally described and set forth the objects of the inventilon, a more detailed description of operable components and reaction conditions will be given.

The polycarboxylic acids used in preparing the compositions and products herein are described in detail in the copending Greenlee application entitled "Polycarboxylic Acids," S.N. 538,235, filed October 3, 1955. They are prepared, for example, by heating a 4,4-bis (hydroxyaryl) pentanoic acid such as 4,4-bis(4-hydroxyphenyl) pentanoic acid with a coupling agent such as a dihalide, an epihalohydrin, or a simple aliphatic polyepoxide. Illustrative polycarboxylic acids are the following:

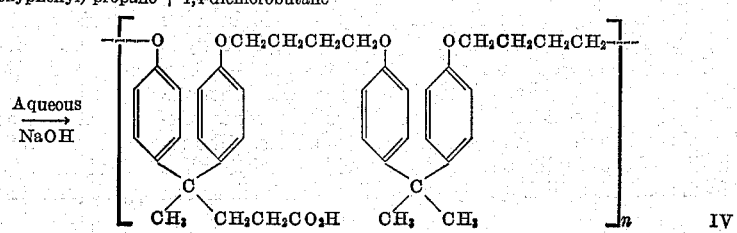

wherein the value of *n*, indicating the degree of polymerization, depends on the quantities of reactants employed but has been found to represent a value of less than about 15.

The end groups in all of these resinous polycarboxylic acids will vary depending on whether the diphenolic acid or the aliphatic coupling agent is used in excess. If excess of the former is used, for example, in reaction with dichlorobutene, the end groups will be phenolic hydroxyl groups. If, on the other hand, dichlorobutene is used in excess the end groups will then be chlorobutene groups.

As illustrated at IV above, the resinous polycarboxylic acids can be modified by using other polyhydric phenols along with the diphenyl carboxylic acids in reaction with the aliphatic coupling agents. Thus, by regulating the amounts of diphenyl carboxylic acid and modifying phenol it is possible to prepare an acid containing a predetermined acid value. Such acids have particular importance in alkali cutting resins as well as in urethane production.

The hydroxyaryl substituted acids used in preparing the polycarboxylic acids must have 2 hydroxyaryl groups attached to a single carbon atom. The preparation of such an aryloxy acid is most conveniently carried out by condensing a keto acid with the desired phenol. To the best of applicant's knowledge any keto acid or ester is operable in which a keto group is connected to a carboxy or carboalkoxy radical through an alkylene radical of at least 2 carbon atoms; however, experience in the preparation of bisphenol and related compounds indicates that the carbonyl group of the keto acid should be positioned next to a terminal methyl group in order to obtain satisfactory yields. Further, while a broad class of acids are contemplated, levulinic acid is preferred since it is readily available.

Prior applications Serial Nos. 464,607 and 489,300 filed October 25, 1954, and February 18, 1955, respectively, disclose a number of illustrative compounds suitable for use as the diphenol carboxylic acid and methods of preparing the same. These materials which are referred to for convenience as diphenol carboxylic acids or by the trade name DPA, consist of the condensation products of levulinic acid and phenol, substituted phenols or mixtures thereof. It is to be understood that the phenolic nuclei of the diphenolic acids may be substituted with any group which will not interfere with the reactions contemplated herein. Such groups are the halo, nitro and alkyl groups of 1 to 5 carbon atoms. While it is possible to condense fluoro substituted phenols with a keto acid, chloro and bromo are the preferred halogens. Examples of alkylated diphenol carboxylic acids are disclosed in the above mentioned co-pending application S.N. 489,300. The diphenol carboxylic acids derived from substituted phenols such as the alkylated phenols are sometimes more desirable than the products obtained from unsubstituted phenols due to properties imparted by the substituted groups. For instance, the alkyl groups provide better organic solvent solubility, flexibility and water resistance. However, the unsubstituted product is usually more readily purified. In the before mentioned condensation reaction between the phenol and keto acid it has been found, as one would expect, that the reaction occurs so that the phenolic hydroxyl group of the biphenolic acid is in a position para or ortho to the point of attachment of the hydroxyaryl radical to the pentanoic acid. Very little or no condensation occurs at the meta position.

The coupling agents advantageously used in building up the desired molecular structure of the polycarboxylic acids are aliphatic compounds, containing from 2–10 carbon atoms, bifunctional in their reactions with phenolic hydroxyl groups to form ether linkages therewith. Exemplary coupling agents are aliphatic dihalides. The reaction of a phenolic hydroxyl group with an alkyl halide forms an ether linkage by the well-known Williamson synthesis employing an alkali metal phenoxide. Similarly the use of a dihalide and a dihydric phenol results in a polymeric structure having an alternating aryl and alkyl nuclei bonded to one another by ether oxygen linkages. It should thus be apparent that virtually any dihalide constitutes a suitable coupling agent for making these polycarboxylic acids provided it contains from 2 to about 10 carbon atoms with at least 2 reactive halogen atoms positioned on different carbon atoms. Further, the halide should contain no substituents which interfere with the etherification reaction. Illustrative dihalides include 1,2-dichloroethane, 1,3-dichloropropane, 1,4-dichlorobutane, 1,4-dichlorobutene, glycerol dichlorohydrin, as well as oxydihalides wherein an ether oxygen separates the alkyl chains or where a hydroxyl group appears on one of the carbon atoms in the alkyl chain. Illustrative compounds are the ethers such as bis (dichloroethyl) ether, and hydroxyhalides such as 1,3 dichloro, 2 hydroxypropane. It should be noted that halo atoms attached to a carbon atom having a double bond linkage are usually only slightly reactive for this purpose.

Similarly the simple epoxy compounds which are bifunctional in their reaction with phenolic hydroxyl groups to form an ether linkage therewith, such as the epihalohydrins or the diepoxides containing from 3–10 carbon atoms, are operable. The preferred epoxy compounds are the epihalohydrins such as epichloro or epibromohydrin. Other exemplary compounds are the oxy epihalohydrins such as 2,3-epoxy propyl, 2'-hydroxy, 3'-chloro propyl ether and the diepoxides such as 1,2-epoxy, 3,4-epoxy butane.

Thus, in general the coupling agent can be described as an aliphatic compound containing from 2–10 carbon atoms with at least 2 functional groups on different carbon atoms capable of forming an ether linkage with a phenolic hydroxyl group. Alternatively the coupling agent can be suitably described by means of the empirical formula X—A—X wherein X can be either an halogen atom or an epoxy group and A is a radical of 2–10 carbon atoms selected from the group consisting of alkylene, hydroxy alkylene, dialkylene ether, and vinylene.

Reaction of the diphenol carboxylic acids with a suitable coupling agent can be conveniently carried out in the presence of an alkali to neutralize the carboxyl group of the diphenol carboxylic acid and to react with the halogen group of the halide or halohydrin. To illustrate, the reaction of one mole of diphenol carboxylic acid with one mole of epichlorohydrin would require 2 mols of sodium hydroxide, one to neutralize the carboxyl group and one to take up the chlorine liberated by the epichlorohydrin in the reaction. Similarly the reaction of 2 mols of a diphenol carboxylic acid with one mol of a dichloride would require 4 mols of sodium hydroxide. Usually the alkali is used in excess of the theoretical amounts. The reactions can be conveniently carried out in an aqueous solution or in the presence of an organic solvent. The temperature range for the reaction is not considered critical, depending to a great extent upon the reactants, the solvent system used, and upon the reaction pressure. If relatively low rather than high temperatures are employed, the reaction takes a correspondingly longer time to go to completion. Although the temperature of the reaction is relatively non-critical, the reactions are preferably carried out at temperatures ranging from 60° to 160° C. Reaction of an active halogen group such as epichlorohydrin and the simultaneous reaction of its epoxide group with a diphenol carboxylic acid to give the polycarboxylic acid might, for example, be carried out at temperatures of from 60–100° C. for periods of 30 minutes to an hour. The reaction of active chlorides such as 1,4-dichlorobutene with the sodium-phenoxide groups may also be carried out at relatively low temperatures on the order of 100° C. for a one hour period. However, the reaction of relatively inactive chlorides such as 1,4-dichlorobutane require temperatures on the order of 100° C. for 3–6 hours or higher temperatures for shorter reaction periods.

If simple aliphatic polyepoxides are employed as coupling agents, much greater care is required to neutralize the carboxyl group of the diphenol carboxylic acid either by esterification or salt formation to prevent the carboxyl group from taking part in the reaction. The reaction is conveniently carried out by heating the neutralized diphenol carboxylic acid with the polyepoxide at temperatures ranging from 90–200° C. preferably in the absence of a solvent. However, if desired, an organic solvent may be used provided there are no functional groups present which would interfere with the reaction of the epoxide group with the phenolic hydroxyl. The resulting product may or may not contain some epoxide content. However, under normal conditions usually no epoxy content is retained.

Examples 1–14 inclusive illustrate the preparation of the polycarboxylic acids employed herein. It will be noted that there are examples of polycarboxylic acids prepared from the unsubstituted diphenol carboxylic acid as well as from halo, nitro and alkyl substituted acids. In addition, examples 7–10 illustrate the preparation of polycarboxylic acids containing alcoholic hydroxyl groups within the same molecule while Examples 5, 6 and 10 describe the preparation of polycarboxylic acids by the reaction of an aliphatic coupling agent with mixtures of a diphenol carboxylic acid and a dihydric phenol which contains no carboxyl groups. Proportions refer to parts by weight unless otherwise indicated.

EXAMPLE 1

In a reaction vessel provided with a thermometer, a mechanical agitator, and a reflux condenser was added 500 parts of water and 124 parts of sodium hydroxide. With continuous agitation 286 parts of 4,4-bis(4-hydroxyphenyl)-pentanoic acid were added, and after completely dissolved 63 parts of 1,4-dichlorobutene-2 were added. The continuously agitated mixture was refluxed for 4 hours, after which the excess caustic was neutralized with HCl. The aqueous layer was removed by decantation and the organic acid layer freed from salt by washing four times with hot water. The resinous product was finally freed from the last traces of water by drying in an oven. The resulting product had a softening point of 105° C. (Durrans' Mercury Method, Journal of Oil and Colour Chemists' Assoc., 12, 173–175 [1929]), and an acid value of 165. Acid value as used herein is defined as the number of milligrams of KOH required to neutralize the acidity of one gram of the sample.

EXAMPLE 2

In a similar manner a solution of 286 parts of 4,4-bis(4-hydroxyphenyl)-pentanoic acid dissolved in an aqueous alkali solution prepared from 124 parts of sodium hydroxide and 400 parts of water was refluxed for 6 hours with 64 parts of 1,4-dichlorobutane. After neutralization with HCl and washing free of salt, the product was freed from the last traces of water by heating with continuous agitation until the temperature had risen to 135° C. The resulting product had an acid value of 163 and a softening point of 117° C.

EXAMPLE 3

In an autoclave provided with a mechanical agitator was placed 1500 parts of water, 300 parts of sodium hydroxide, 858 parts of 4,4-bis(4-hydroxyphenyl)-pentanoic acid, and 286 parts of bis (2-chloroethyl) ether. The autoclave was closed and the reaction mxture heated with agitation at 150° C. for a period of 5 hours. The reaction mixture was cooled to below 100° C. so as to release pressure and the product was neutralized with HCl. The aqueous layer was removed by decantation and the resinous product washed four times with hot water to remove sodium chloride. The product was finally freed from the last traces of water by heating with continuous agitation to a temperature of 130° C. The product had a softening point of 72° C. and an acid value of 147.

EXAMPLE 4

A mixture of 1144 parts of 4,4-bis(4-hydroxyphenyl)-pentanoic acid, 320 parts of sodium hydroxide, 1500 parts of water, and 286 parts of bis(2-chloroethyl) ether was treated in the manner described in Example 3 and gave a product having a softening point of 69° C. and an acid value of 164.

EXAMPLE 5

Following the procedure of Example 3 a mixture of 342 parts of bis(4-hydroxyphenyl)-isopropylidene, 572 parts of 4,4-bis(4-hydroxyphenyl)-pentanoic acid, 358 parts of bis(2-chloroethyl) ether, 1500 parts of water, and 300 parts of sodium hydroxide was heated for 7 hours at 150° C., neutralized, washed, and dried to give a product having a softening point of 59° C. and an acid value of 89.

EXAMPLE 6

A mixture of 228 parts of bis(4-hydroxyphenyl)-isopropylidene, 572 parts of 4,4-bis(4-hydroxyphenyl)-pentanoic acid, 286 parts of bis(2-chloroethyl) ether, 1000 parts water, and 280 parts of sodium hydroxide was treated as in Example 3, except that it was heated for 6 hours at 150° C. The product, after neutralization, washing and drying, had an acid value of 118 and a softening point of 73° C.

EXAMPLE 7

In a flask provided with a thermometer, a mechanical agitator, and a reflux condenser was added 800 parts of water, 80 parts of sodium hydroxide, and 286 parts of 4,4-bis(4-hydroxyphenyl)-pentanoic acid. After the diphenolic acid had all dissolved and at a temperature of 65° C., 75 parts of epichlorohydrin was added. With continuous agitation the temperature was gradually raised to 90° C. and held at 90–95° C. for a period of 1 hour. The product was neutralized with HCl and the aqueous layer removed by decantation. After washing the product four times with hot water to remove the sodium chloride, the product was freed from the last traces of water by heating to a temperature of 110° C. This product had an acid value of 133. Although this product was a hard, brittle solid, softening points as determined on the products of Examples 1 to 6 inclusive give inconsistent results due to the fact that some interesterification of the alcoholic hydroxyl groups with the carboxylic acid groups takes place when the product is heated to temperatures of 100° C. or higher.

EXAMPLE 8

A mixture of 286 parts of 4,4-bis(4-hydroxyphenyl)-pentanoic acid, 800 parts of water, 80 parts of sodium hydroxide and 69 parts of epichlorohydrin treated as in Example 7 gave a hard, brittle, resinous product having an acid value of 136.

EXAMPLE 9

Following the procedure set forth in Example 7, a mixture of 286 parts of 4,4-bis(4-hydroxyphenyl)-pentanoic acid, 600 parts of water, 60 parts of sodium hydroxide, and 47 parts of epichlorohydrin gave a final product having an acid value of 162 and an initial softening point of 80° C.

EXAMPLE 10

A mixture of 191 parts of 4,4-bis(4-hydroxyphenyl)-pentanoic acid, 76 parts of bis(4-hydroxyphenyl) isopropylidene, 62 parts of epichlorohydrin, 600 parts of water, and 68 parts of sodium hydroxide was treated in the manner set forth in Example 7 and gave a product having an acid value of 108 and an initial softening point of 105° C.

EXAMPLE 11

A mixture of 63 parts of diphenol carboxylic acid, prepared from ortho cresol and levulinic acid in the manner described in my co-pending application S.N. 489,300, and 24 parts sodium hydroxide dissolved in 80 parts water was charged to a 3 neck flask equipped with a thermometer, mechanical agitator and reflux condenser. The charge was heated to 60° C. using an electric heating mantle at which temperature 13 parts 1-4 dichlorobutane were added. The temperature was raised to 95° C. and held for a period of 5½ hours. The reaction mixture was poured into a stainless steel beaker and acidified with 37% hydrochloric acid. A resinous material precipitated out. This precipitate was washed 4 times with boiling water and the resin dehydrated by raising the temperature to 138° C. with constant stirring. The resultant resin was a clear, brown, amber solid having an acid value of 144 and a softening point of 88° C.

EXAMPLE 12

A mixture of 69 parts of diphenol carboxylic acid prepared from 3-5 xylenol and levulinic acid in a manner described in my co-pending application S.N. 489,300, and 24 parts sodium hydroxide dissolved in 200 parts water was charged to a 3-liter flask equipped with a thermometer, reflux condenser and mechanical agitator. The charge was heated to approximately 49° C. at which temperature 13 parts dichlorobutane were added. The temperature was raised to 96° C. and held for approximately 5 hours. The reaction mixture was acidified with dilute hydrochloric acid while stirring at approximately 80° C. The resinous mass which precipitated out was washed 3 times with boiling water. After washing, the resin was dehydrated by heat to 135° C. with constant stirring. The resultant product was a clear, dark amber resin having an acid value of 142 and a melting point of 98° C.

EXAMPLE 13

Dichloro DPA was prepared by charging 363 parts of the ethyl ester of 4,4 bis(4-hydroxyphenyl)pentanoic acid and 344 parts of sulfonyl chloride to a 3-necked flask equipped with thermometer, mechanical stirrer and reflux condenser. The reaction immediately exothermed and was cooled with a water bath, maintaining the temperature at approximately 25° C. for one hour. The reaction charge became thick and then solidified with a pronounced temperature rise. The charge had a yellow color. Excess sulfonyl chloride was removed under slight pressure. The obtained ester had a chlorine content of 21.38% corresponding to the addition of approximately 2 chlorine atoms (theoretical=18.5%). The chlorinated ester was saponified to obtain the corresponding acid.

72 parts of dichloro DPA and 24 parts sodium hydroxide dissolved in 200 parts of water were charged to a 3-liter flask equipped with thermometer, reflux condenser and mechanical agitator. The charge was heated to approximately 75° C. at which temperature 13 parts dichlorobutane were added. The temperature was raised to approximately 96° C. and held for a period of 6 hours. The reaction mixture was acidified with hydrochloric acid and washed 4 times with boiling water. The resin was dehydrated by heating with constant stirring to 130° C. The resultant product was a clear amber resin having an acid value of 157.

EXAMPLE 14

Dinitro DPA was prepared by charging 172 parts DPA and 450 parts glacial acetic acid to a 1 liter 3-neck flask equipped with a thermometer, reflux condenser and mechanical stirrer. The resultant solution was tan in color. 264 parts of benzene were added to the charge before cooling to 0° C. in an ice bath. At this temperature drop-wise addition of 85.8 parts 70% nitric acid diluted with 66 parts of glacial acetic acid was begun. The complete addition required 3 hours and 45 minutes with the reaction temperature never exceeding 0° C. The reaction charge at the end of the addition was a clear, dark reddish-black solution. The charge was allowed to stir at temperatures between 5 and 20° C. for approximately 12 hours. At the end of this time a heavy orange precipitate had formed. The precipitate was filtered and washed 3 times with distilled water before it was vacuum dried. The resultant crude material recovered at 84.5% of theoretical had an acid value of 488, theoretical 447 and a melting point of 102–4° C. The crude material was recrystallized from a mixture of hot ethanol and water to give a fine yellow crystalline material having a melting point of 137.5–140° C., a nitrogen content of 7.20% (theoretical=7.44%) and an acid value of 445.

76 parts of dinitro DPA and 24 parts sodium hydroxide dissolved in 200 parts of water were charged to a 3-liter flask equipped with thermometer, reflux condenser and mechanical agitator. The charge was heated to approximately 75° C. at which temperature 13 parts dichlorobutane were added. The temperature was raised to approximately 95° C. and held for a period of 6½ hours. The resin was dehydrated by heating with constant stirring to 130° C. The resultant product was a clear dark amber resin having an acid value of 135.

In Examples 1 through 14, inclusive, the diphenol carboxylic acid can be replaced by diphenol carboxylic acids containing chloro, bromo, nitro and 1 to 5 carbon atom alkyl groups including 4,4-bis(4-hydroxy-3-ethyl phenyl)-pentanoic acid, 4,4-bis(4-hydroxy-3,5-isopropyl phenyl) - pentanoic acid, 4,4 - bis(4 - hydroxy - 2 - ethyl phenyl)-pentanoic acid, 4,4-bis(4-hydroxy-2,5-diamyl phenyl)-pentanoic acid, 4,4-bis(2-hydroxy-4-butyl phenyl)-pentanoic acid, 4,4-bis(2-hydroxy-5-methyl-3-chloro phenyl) pentanoic acid, 4,4-bis(4-hydroxy-3,5-dibromo phenyl)-pentanoic acid, 4,4-bis(4-hydroxy-3-nitro nitro phenyl) - pentanoic acid, 4,4 - bis(2 - hydroxy - 3 - nitro - 5 - methyl phenyl) - pentanoic acid, 4,4 - bis(4-hydroxy - 3 - methyl - 5 - chloro phenyl) - pentanoic acid, 4,4 - bis(4 - hydroxy - 3 - amyl phenyl) - pentanoic acid, 4,4 - bis(4 - hydroxy - 3 chloro phenyl) - pentanoic acid, 4 - (4 - hydroxyphenyl) - 4 - (4 - hydroxy - 3 - amyl phenyl) - pentanoic acid, 4 - (4 - hydroxyphenyl) - 4 - (2 - hydroxy - 4 - chlorophenyl) - pentanoic acid, 4 - (4-hydroxyphenyl) - 4 - (4 - hydroxy - 3,5 - dibromo phenyl) - pentanoic acid, 4 - (4 - hydroxyphenyl) - 4 - (2-hydroxy - 4 - nitro phenyl) - pentanoic acid, 4 - (4 - hydroxyphenyl) - 4 - (4 - hydroxy - 3 - sulfo phenyl) pentanoic acid, and 4-(4-hydroxyphenyl)-4-(2-hydroxy-3,5-dimethyl phenyl) pentanoic acid.

In Examples 1 through 14, inclusive, the coupling agent can be replaced by other compounds bi-functional in their reactions with phenolic hydroxyl groups to form ether linkages therewith, including epibromohydrin, 1,3-dichloropropane, 1,4-dibromobutane, 1,2-dibromoethane, 2,3 - epoxypropyl - 2' - hydroxy - 3' - chloropropyl ether, 1,5-dichloropentane, 1,5-dichloropentene-3,1,6-dibromoheptane, bis(dibromobutyl)ether, bis(dibromoamyl)ether, 1,2-epoxy-3,4-epoxy-butane, dichlorisopropyl ether, triglycol dichloride, and 2-ethylhexane-1,6-dichloride.

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and nuclei connected to each other by ether linkages, containing terminal epoxide groups and free from functional groups other than epoxide and hydroxyl groups. It should be understood that significant amounts of the monomeric reaction products are often present. This would be illustrated by V to VII below where $n$ equals zero. Preparation of these epoxide materials as well as illustrative examples are described in U.S. Patents 2,456,408, 2,503,726, 2,615,007, 2,615,008, 2,668,807, 2,688,805, and 2,698,315. Well-known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin

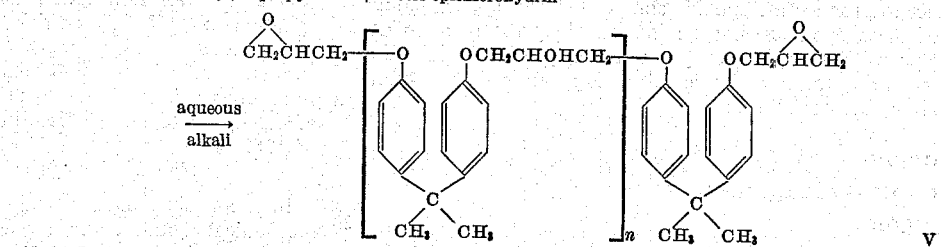

V

Polyhydric phenol and a polyepoxide bis(hydroxyphenyl)isopropylidene + excess butylene dioxide

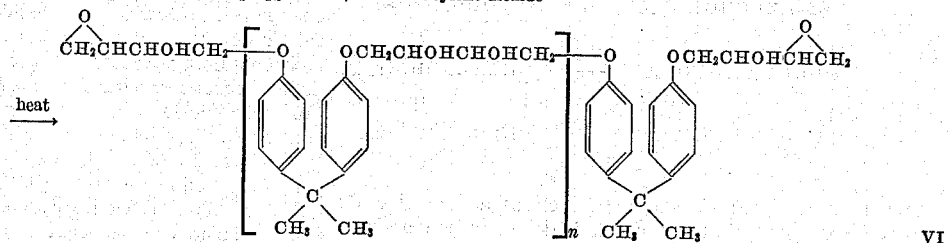

VI

Polyhydric phenol and a polyhalohydrin bis(hydroxyphenyl)isopropylidene + excess alpha-glycerol dichlorohydrin

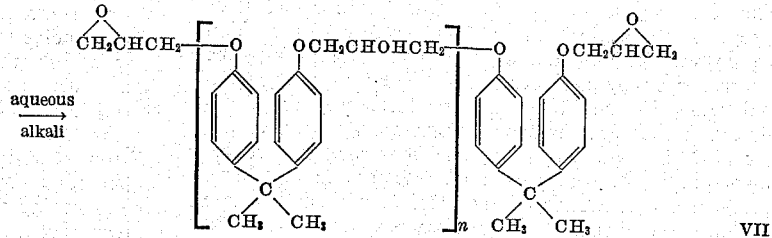

VII

As used in the above formulas, $n$ indicates the degree of polymerization depending on the molar ratio of reactants. As can be seen from these formulas, the complex epoxide resins used in this invention contain terminal epoxide groups and alcoholic hydroxyl groups attached to the aliphatic portions of the resin, the latter being formed by the splitting of epoxide groups in the reaction of the same with phenolic hydroxyl groups. Ultimately, the reaction with the phenolic hydroxyl groups of the polyhydric phenols is generally accomplished by means of epoxide groups formed from halohydrins by the loss of hydrogen and halogen as shown by the following equation:

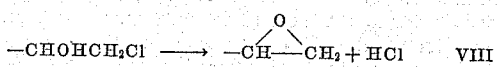  VIII

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955.

Polyepoxide compositions useful in this invention also include the epoxidized unsaturated natural oil acid esters, including the unsaturated vegetable, animal, and fish oil acid esters made by reacting these materials with various oxidizing agents. These unsaturated oil acid esters are long chain aliphatic acid esters containing from about 15 to 22 carbon atoms. These acids may be esterified by simple monohydric alcohols such as methyl, ethyl, or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain more than 1 up to 20 epoxide groups per molecule. The method of epoxidizing these unsaturated oil esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion. In the polymerization of these ethers there is probably some polymerization occurring through the epoxide groups, and in addition some splitting of the epoxide groups to form hydroxyl groups so that pure compounds are not usually obtained.

Other aliphatic polyepoxides useful in this invention may be illustrated by the poly(epoxyalkyl) ethers derived from polyhydric alcohols. These materials may, in general, be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

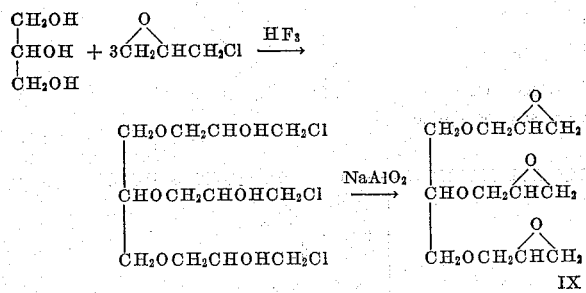

It is to be understood that such reactions do not give pure compounds and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive and are not to be considered as functional groups in the conversion of the reaction mixtures of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether, and epoxidized polybutadiene.

Immediately following will be a description or illustration of preparations of polyepoxides which will be used in examples of compositions of this invention.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl)isopropylidene with a molar excess of epichlorohydrin in varying amounts.

| Epon resin type | Melting point, °C. | Viscosity [1] (Gardner-Holdt) | Epoxide equivalent | Average molecular weight |
|---|---|---|---|---|
| Epon 864 | 40– 45 | A₁–B | 325 | 450 |
| Epon 1001 | 64– 76 | C–G | 480 | 640 |
| Epon 1004 | 95–105 | Q–U | 870 | 1,133 |
| Epon 1007 | 127–133 | Y–Z₁ | 1,750 | |
| Epon 1009 | 145–155 | Z₂–Z₃ | 3,200 | |

[1] Based on 40% nonvolatile in butyl Carbitol at 25° C.

Examples 15 through 17 describe the preparation of typical polyepoxide polyesters.

EXAMPLE 15

*Preparation of polyester from tetrahydrophthalic anhydride and ethylene glycol*

In a 3-necked flask provided with a thermometer, mechanical agitator, and a reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

*Epoxidation of the polyester resin*

In a 3-necked flask provided with a thermometer, a mechanical agitator, and a reflux condenser was placed 107 parts of the dehydrated acid form of a cation exchange resin (Dowex 50 X–8, 50–100 mesh, Dow Chemical Company, a sulfonated styrenedivinylbenzene copolymer containing about 8% divinylbenzene, the percent divinylbenzene serving to control the amount of cross-linkage. The Dowex resins are discussed in publications entitled "Ion Exchange Resins No. 1" and "Ion Exchange Resins No. 2," copyright 1954 by Dow Chemical Company, the publications having form number Sp32–254 and Sp31–354, respectively) and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour, 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 42. The percent non-volatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrene-divinylbenzene copolymer illustrated by the formula RR′₃N⁺OH⁻ where R represents the styrene-divinylbenzene matrix and R′ is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a nonvolatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

EXAMPLE 16

Following the procedure of Example 15, a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

EXAMPLE 17

The process of Example 15 was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Examples 18 through 20 describe the preparation of epoxidized vegetable oil acid esters.

EXAMPLE 18

*Epoxidized soyabean oil acid modified alkyd resin*

(a) *Preparation of alkyd resin.*—To a kettle provided with a condenser was added 290 parts of white refined soyabean oil. While bubbling a continuous stream of nitrogen through this oil the temperature was raised to 250° C., at which temperature 0.23 part of litharge were added and the temperature held at 250° C. for 5 minutes. While holding the temperature above 218° C., 68 parts of technical pentaerythritol were added after which the temperature was raised to 238° C. and held until a mixture of 1 part of the product and 2½ parts of methyl alcohol showed no insolubility (about 15 minutes). At this point 136 parts of phthalic anhydride were added and the temperature gradually raised to 250° C. and held at this temperature for 30 minutes. At this point the condenser was removed from the kettle and the pressure reduced somewhat by attaching to a water aspirator evacuating system. With continuous agitation the mixture was held at 250° C. until the acid value had reached 10.5. At this point the resin was thinned with xylene to 48% nonvolatile content having a viscosity of H (Gardner Bubble Viscosimeter).

(b) *Epoxidation of a soyabean oil acid modified alkyd resin.*—In a 3-necked flask provided with a thermometer, a mechanical agitator and a reflux condenser was placed 70 parts of dehydrated acid form of a cation exchange resin (Dowex 50 X-8) and 15 parts glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution were thoroughly mixed with 110 parts of the dehydrated basic form of Dowex 1 (an amine type anion exchange resin). The resulting mixture was then filtered, followed by pressing as much of the solution as possible from the anion exchange resin cake.

EXAMPLE 19

*Epoxidized oleic acid modified alkyd resin*

(a) *Preparation of alkyd resin.*—In a flask provided with a thermometer, a mechanical agitator and a condenser attached through a water trap was placed 434 parts of glycerine and 1270 parts of oleic acid. While bubbling a continuous stream of nitrogen through the mixture, the temperature was gradually raised with agitation to 220° C. over a period of 2 hours. Reaction was continued for a period of 1½ hours at this temperature until the acid value on the mixture of glycerine and oleic acid had reached 10. At this point 617 parts of phthalic anhydride were added and the temperature was gradually increased to 250° C. and held at this temperature for 2 hours and 30 minutes until the acid had again decreased to below 10. The final constants on this product were acid value 6.3, iodine value 69, and viscosity A-1 at a nonvolatile content of 60% in xylene.

(b) *Epoxidation of oleic acid modified alkyd resin.*—The resin was epoxidized in accordance with the procedure given under part b of Example 18, the given product having an epoxide equivalent weight of 552. This product was adjusted to a nonvolatile content of 34% in xylene.

EXAMPLE 20

*Epoxidized soyabean oil*

Admex 710, an epoxidized soyabean oil having an equivalent weight to an epoxide of 263, was dissolved in methyl ethyl ketone to a non-volatile content of 50%. Admex 710, a product of the Archer-Daniels-Midland Company, has an acid value of 1, a viscosity of 3.3 stokes at 25° C. and an average molecular weight of 937.

EXAMPLE 21

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature, the inorganic material was removed by filtration. The dioxane and low boiling products were removed by heating the filtrate to 205° C. at 20 mm. pressure to give a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

EXAMPLE 22

In a 3-necked flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide dissolved in diethyl phthalate to a 60% content was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure end a pot temperature of 26° C. and volatile material finally removed at a pressure of 3 mm. and a pot temperature of 50° C. The residual product had a molecular weight of 418, and equivalent weight to epoxide content of 198, the yield amounting to 250 parts.

Two general classes of aldehyde condensates are contemplated for preparing the modified products of this invention, those prepared from ammonia derivatives and those derived from phenols, with the choice being dependent on the end uses and characteristics desired. For instance, if the end use were to be a white enamel, the ammonia derivative-aldehyde condensates would probably be chosen because of their extremely light initial color and their good color retention. The phenols are somewhat darker in color and have a tendency to yellow upon aging. For the most desirable non-polar solvent solubility, the phenol-aldehyde condensates would be the proper choice since the ammonia derivative-aldehyde condensates usually require some butanol and xylol present to give the desirable solubility. For certain applications, the butanol odor is objectionable and at times butanol is incompatible with other resins which are used. Adhesion to metals also appears to be better in the phenol-aldehyde condensates. From an economic standpoint, the phenol-aldehyde condensates are advantageous, being lower in price.

The aldehyde-ammonia derivative condensation products are formed by the reaction of aldehydes with amines or amides such as urea, thiourea, and their derivatives, melamines and sulfonamides. It is necessary that the ammonia derivative contain at least one >NH group. Thus nitriles and tertiary amines which are also considered ammonia derivatives are excluded. Otherwise the definition reads on amides and primary and secondary amines. It is well known that such materials including a number of derivatives react with formaldehyde to form aldehyde-amine or aldehyde-amide condensates. Exemplary derivatives are substituted urea, thiourea, or melamine such as the long-chain alkyl-substituted materials which impart oil or organic solvent solubility. Suitable sulfonamides include aromatic mononuclear sulfonamides such as toluene sulfonamide, polynuclear sulfonamides such as naphthalene sulfonamide, sulfonamides of aromatic polynuclear ethers and mono- or polyfunctional sulfonamides. In addition to melamine, other operable ammonia derivatives containing the azide bridge are the amino di- and triazines.

In the condensation of aldehydes with the organic ammonia derivatives, initially the reaction appears to be the addition of aldehyde to the organic ammonia derivative to form primarily intermediate alkylol compounds. These compounds will further condense to form more resinous materials, combining with each other through alkylene bridges formed between the nitrogen atoms of the compounds.

In the alkylol condensate and in the more condensed products of an advanced stage of condensation, there are hydrogen atoms present in the hydroxyl groups which have been formed in the production of the alkylol condensate and which have not been destroyed by further condensation. There are also an appreciable number of hydrogen atoms attached to nitrogen atoms of the amide or amine groups present in the condensation products. These hydrogens contained in the hydroxyl groups and the amide or amine groups are active with respect to epoxide groups and will react therewith in the reaction mixtures of this invention to form complex, crosslinked products.

In general, the condensation products of ammonia derivatives and aldehydes contemplated herein are partial and intermediate reaction or condensation products of aldehydes, particularly formaldehyde, with amines or amides, or mixtures thereof. The reactions which produce such condensation products involve the removal of amino or amido hydrogen atoms from the ammonia derivative. Therefore, it should be understood that an ammonia derivative as stated hereinbefore, in order to be suitable for condensation with an aldehyde, must contain at least one hydrogen atom attached to the nitrogen atom. Fusible materials of varying degrees of condensation may be used with the epoxides and the polycarboxylic acids to form the new compositions and reaction products of this invention. Thus, the condensates may be made by various processes known in the art for the manufacture of aldehyde-ammonia derivative resins, resulting in water-soluble, alcohol-soluble or oil-soluble types.

For use herein, the aldehyde-ammonia derivative condensate may be in its monomeric form which is essentially an alkylol or polyalkylol product or it may be highly condensed. It is suitable as long as it is still fusible and is soluble in or compatible with the expoxide composition and the polycarboxylic acid composition with which it is to be reacted.

Many of the commercial products derived from the reaction of urea, thiourea, or melamine with formaldehyde are mixed products made by reacting the formaldehyde with mixtures of these materials. Such composite or mixed reaction products can advantageously be used for reaction with the epoxides and the polycarboxylic acids according to the present invention. In addition, many of the present day commercial resins derived from aldehydes and urea, thiourea, or melamine, or a mixture thereof, are prepared in the presence of alcoholic or other solvents which take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are also suitable. In some cases it may be desirable to use an ammonia derivative-aldehyde condensate which is completely soluble in a common solvent or a mixture of solvents used to dissolve the epoxide and the polycarboxylic acid. Solutions prepared in this manner can be applied as a coating and the solvent subsequently evaporated before the main reaction between the epoxide, polycarboxylic acid and condensate takes place.

Examples 23 to 27, inclusive, describe the preparation of typical ammonia derivative-aldehyde condensates suitable for use herein.

EXAMPLE 23

In a 3-liter 3-neck flask provided with a mechanical agitator, a thermometer, and reflux condenser was placed 120 parts of urea, 600 parts of 37% aqueous formaldehyde, and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white, syrupy liquid isolated.

EXAMPLE 24

The procedure of preparation including the water removal was the same as that used in Example 23. A mixture of 304 parts of thiourea, 960 parts of 37% aqueous formaldehyde, and 800 parts of n-butyl alcohol was used to give a final yield of 1214 parts of a clear, light amber, syrupy product.

EXAMPLE 25

The procedure of preparation including the removal of water was the same as that used in Example 23. A mixture of 120 parts of urea, 148 parts of thiourea, 950 parts of 37% aqueous formaldehyde, and 800 parts of n-butyl alcohol was used to give a final yield of 1175 parts of a clear, almost colorless, syrupy liquid.

EXAMPLE 26

In a 3-liter 3-neck flesk provided with a mechanical agitator, a thermometer, and a reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amounting to 1342 parts was a clear, water-white, heavy, syrupy liquid.

EXAMPLE 27

In a 3-liter 3-neck flask provided with a mechanical agitator, a thermometer, and a reflux condenser was placed 1370 parts of p-toluenesulfonamide and 640 parts of 37% aqueous formaldehyde the pH of which had been previously adjusted to 6.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30–50 mm. pressure, using a maximum flask temperature of 90° C. to yield 1245 parts of water-white resinous solid.

The second class of condensates suitable for modifying the compositions herein described are those which contain reactive phenolic hydroxyl groups formed by the reaction of phenols and aldehydes. Phenol and formaldehyde react to form a variety of reaction products depending upon the proportions and conditions of reaction. These include products such as phenol alcohols having both phenolic and alcoholic hydroxyl groups, and products of the diphenolmethane type containing phenolic hydroxyl groups only. The condensation of phenol and formaldehyde can be carried out with the use of acid or alkaline condensing agents and in some cases by first combining the aldehyde with an alkali such as ammonia to form hexamethylenetetramine and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant compositions that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxides and polycarboxylic acid for subsequent reaction therewith.

The phenol-aldehyde condensates may be derived from mononuclear phenols, polynuclear phenols, monohydric phenols, or polyhydric phenols. The critical requirement for the condensate is that it be compatible with the polyepoxides and polycarboxylic acid or with the two reactants in a solvent used as a reaction medium. The phenol-aldehyde condensate which is essentially a polymethylol phenol rather than a polymer may be used in the preparation of the new phenol-aldehyde, polyepoxide, polycarboxylic acid products, or it may be used after further condensation, in which case some of the methylol groups are usually considered to have disappeared in the process of condensation. Various so-called phenolic resins which result from the reaction of phenols and aldehydes, and particularly from common phenols or cresols and formaldehyde, are available as commercial products both of an initial and intermediate character. Such products include resins which are readily soluble in common solvents or readily fusible so that they can be admixed with the epoxides and polycarboxylic acid and reacted therewith to form the products of this invention.

In selecting a phenol-aldehyde condensate one may choose either the heat-converting or the permanently fusible type. For example, the formaldehyde reaction products of such phenols as carbolic acid, resorcinol, and 2,2-bis(4-hydroxyphenyl)propane readily convert to infusible, insoluble compositions on the application of heat. On the other hand, some of the para alkylated phenols, as illustrated by p-tert-butylphenol, produce permanently fusible resins on reaction with formaldehyde. Even though fusible condensates are employed, however, insoluble, infusible products result when they are heated in combination with the epoxides and the polycarboxylic acid described.

Examples 28 to 30, inclusive, describe the preparation of some of the operable phenol-aldehyde condensates which may be used in combination with the polyepoxides and the polycarboxylic acids to form the products herein described. It is to be noted that the three examples are drawn from distinct classes of phenols and are meant to be representative of the broad class of phenols. Thus, in Example 28, the phenol is a dihydroxy dinuclear phenol, in Example 29 an alkyl-substituted phenol, and in Example 30 a simple phenol. The examples, therefore, illustrate the unsubstituted monohydric phenols, the substituted monohydric phenols, and the polynuclear phenols.

EXAMPLE 28

*Condensation of Bisphenol A [2,2-bis(4-hydroxyphenyl)-propane] with formaldehyde*

In a 3-liter 3-neck flask provided with a mechanical agitator, a thermometer, and a reflux condenser was placed 912 parts of Bisphenol A, 960 parts of 37% aqueous formaldehyde, and 2.3 parts of oxalic acid. With continuous agitation, the reaction mixture was heated to the reflux temperature and refluxing continued for a period of 1 hour. After permitting the reaction mixture to cool to around 50° C. the water layer was removed by decantation. The phenol-formaldehyde layer was then washed three times with water which in each case was removed by decantation. The last portion of water was removed by distillation at reduced pressure using a water aspirator system which gave pressure around 30–40 mm. The temperature during the removal of this last portion of water ranged from 70–90° C. The product, amounting to 1065 parts, was a clear, heavy, syrupy material.

EXAMPLE 29

*Reaction of p-tertiary butylphenol with formaldehyde*

The procedure of preparation, including the dehydration step, was the same as that used in Example 28. A mixture of 1000 parts of p-tert-butylphenol, 1067 parts of 37% aqueous formaldehyde, and 10 parts of sodium hydroxide was used to give a final yield of 1470 parts of a clear, almost colorless syrupy product.

EXAMPLE 30

*Reaction of phenol with formaldehyde*

Again a reaction procedure including the dehydration step, was the same as that used in Example 28. A mixture of 658 parts of phenol, 1400 parts of 37% aqueous formaldehyde, and 6.6 parts of sodium hydroxide was used to give a final yield of 1168 parts of a clear, syrupy product.

In Examples 23 to 30 inclusive, the aldehyde can be replaced by other mono-aldehydes including acetaldehyde, propionaldehyde, n-butyraldehyde, isobutyraldehyde, valeraldehyde, capronaldehyde, heptaldehyde as well as the more complex aldehydes such as furfural.

In Examples 28 to 30 inclusive, the phenol can be replaced by other phenols including ortho, meta, and para cresol, 2,4 xylenol, 3,4 xylenol, 2,5 xylenol, 3,5 xylenol, p-phenyl phenol, p-cyclohexylphenol, and p-tert-amylphenol.

In making the new compositions, the polyepoxide and polycarboxylic acid or such compositions modified with aldehyde condensates are admixed in suitable proportions and reaction will proceed merely by the application of heat. More specifically the reaction is effected by heating the mixtures at elevated temperatures, usually in the range of about 100–250° C. Catalysts are unnecessary, but in certain cases it may be desirable to speed up the reaction by the use of catalysts, such as boron trifluoride adducts, sodium phenoxides, and mineral acid type catalysts.

The reaction mixtures and final reaction products of this invention may be prepared by using varying ratios of epoxide to polycarboxylic acid. The quantities of reactants employed in a given instance will depend upon the characteristics desired in the final product. Flexible conversion products can be obtained from a hard epoxide by employing relatively large amounts of a low-melting polycarboxylic acid or a low-melting polycarboxylic acid and a low-melting phenol-aldehyde condensate or flexibility may be imparted by larger amounts of a soft epoxide. In general, operable products are those in which the ratio of epoxide to polycarboxylic acid ranges from about 6:1 to 1:6 with the preferred range, on an equivalent weight basis, because of the general overall characteristics, being from 2:1 to 1:2. In instances where an aldehyde condensate is used as a modifier, operable amounts on a weight basis range up to about 90%, but from a practical standpoint, the preferred percentage is about 10% to 35%. Equivalent weight as used above refers to the weight of polyepoxide per epoxide group, in the case of the polyepoxide, and the weight of the diphenol carboxylic acid ether per phenolic hydroxyl or carboxyl group, in the case of the ether.

Compositions containing the polyepoxides and the polycarboxylic acid or such compositions modified with aldehyde condensates may be used as mixtures or at varying intermediate stages of reaction. The initial mixtures or intermediate reaction products which are soluble in common organic solvents may be blended in solution in proper proportions and the solutions then applied as an impregnant for fabrics or paper, or for the formation of protective coating films. Subsequent heating functions to remove the solvent and bring about polymerization to the insoluble, infusible state. For other uses, the initial or intermediate mixture may be used without a solvent, giving directly a composition which, on the application of heat, converts to an infusible, insoluble final product.

For the preparation of semi-liquid adhesive compositions, low-melting or syrupy polyepoxides would be used with a low-melting polycarboxylic acid or polycarboxylic acid and aldehyde condensate. For various other applications, higher melting compositions are desirable in which case partially polymerized mixtures of the polyepoxide and the polycarboxylic acid could advantageously be used. An alternative method of obtaining the higher melting compositions is to choose higher melting forms of the polyepoxide and polycarboxylic acid.

In making the new compositions and products herein described, the polyepoxides and the polycarboxylic acid or such compositions modified with aldehyde condensates may be used in regulated proportions without the addition of other materials. For certain uses, other components are often advantageously added, including filling and compounding materials, plasticizers, pigments, etc. Compositions which tend to give somewhat brittle products on conversion to the insoluble, infusible state are advantageously compounded with plasticizers. For most applications, it is possible to obtain suitable flexibility and toughness by regulating the proportions and types of reacting ingredients, thereby obviating the need for plasticizers.

The application of heat to the mixtures herein set forth may involve several chemical reactions. It will be appreciated that the reactions involved are very complex and the extent to which each takes place will vary with the temperature used in heat treating, the period of time therefor, and with the particular types of polyepoxides, aldehyde condensate, if used, and polycarboxylic acid chosen. While it is not desired to be limited by any theoretical explanation of the exact nature of these reactions, it seems probable that conversion to the final polymeric products is accompanied by direct polymerization of the epoxide groups inter se; reaction of the epoxide groups with methylol hydroxyl groups; reaction of the epoxide groups with phenolic hydroxyl groups, and reaction of epoxide groups with active hydrogen attached to a nitrogen atom, all of which take place to some extent simultaneously in forming the final products.

The present invention provides a wide range of reaction compositions and products including initial mixtures of the polyepoxides, aldehyde condensates, and the polycarboxylic acid, partial or intermediate reaction products of such mixtures and compositions containing such intermediate reaction products as well as final reaction products. In general, the initial mixtures, as well as the intermediate reaction products unless too highly polymerized, are soluble in solvents of the lacquer type, such as ketone or ester solvents.

In addition to having outstanding physical properties, such as hardness, toughness, and flexibility, the final infusible, insoluble products have outstanding chemical properties, such as high resistance to oxidation, water, alkali, acids and organic solvents. It has also been observed that the final conversion products possess unusually good adhesion to most surfaces including metal, glass, wood, and plastics. This property of outstanding adhesion to a wide variety of surfaces gives the subject products high potential value for use in formulating adhesives. This property is also of extreme value in formulating protective coating films for use on many types of surfaces. The adhesion characteristics are probably due to the fact that even in the converted, infusible state, the compositions contain a relatively high percentage of highly polar groups, such as ether groups, ester groups, and alcoholic and phenolic hydroxyl groups. Despite the high percentage of polar groups in the insoluble, infusible products of this invention the tolerance for water is unusually low, apparently due to the high molecular weight and rigid cross-linked structure of the final compositions.

Examples 31 to 140, inclusive, illustrate the preparation of insoluble, infusible protective coating films from the compositions of this invention. In the preparation of the compositions for heat curing to form the protective coating films, each of the polycarboxylic acids and the polyepoxides with the exception of epoxidized polyesters were dissolved in methyl ethyl ketone to a nonvolatile content of 40–60%. The epoxidized polyesters were used at the nonvolatile and in the solvent in which they were prepared. The aldehyde condensates were dissolved in a mixture of methyl ethyl ketone and butanol to a non-volatile content of 40-60%. Mixtures of the resinous polycarboxylic acids and polyepoxides or such compositions modified with aldehyde condensates were found to be stable for extended periods of time at normal temperatures. Mixtures of the solutions were spread on panels with a .002" Bird applicator and the films were baked for periods of 30 to 90 minutes at temperatures ranging from 150-200° C. Proportions as used in the following table refer to parts by weight and are based on the non-volatile content of the solutions of reactants.

| Ex. No. | Polyepoxide | Parts | Polycarboxylic acids | Parts | Aldehyde condensate | Parts | Catalyst Type | Catalyst Parts | Conversion Time (hrs.) | Conversion Temp. (° C.) | Film resistance H₂O at (100° C.), hr. | Film resistance Hours 5% aqueous NaOH (at 25° C.), hr. |
|---|---|---|---|---|---|---|---|---|---|---|---|---|
| 31 | Epon 1001 | 7 | Ex. 1 | 5 | | | | | 1 | 175 | 7½ | 68 |
| 32 | do | 7 | Ex. 2 | 5 | | | | | 1 | 175 | 7⅓ | 180 |
| 33 | do | 6.5 | Ex. 3 | 5 | | | | | 1 | 175 | 7⅓ | 92 |
| 34 | do | 7 | Ex. 4 | 5 | | | | | 1 | 175 | 7¼ | 12 |
| 35 | Epon 1004 | 12.6 | Ex. 1 | 5 | | | | | 1 | 175 | 7¼ | 92 |
| 36 | do | 13 | Ex. 2 | 5 | | | | | 1 | 175 | 7⅓ | 180 |
| 37 | do | 11.7 | Ex. 3 | 5 | | | | | 1 | 175 | 7½ | 180 |
| 38 | do | 13 | Ex. 4 | 5 | | | | | 1 | 175 | (¹) | 68 |
| 39 | Epon 1001 | 3.5 | Ex. 1 | 3.75 | | | | | 1 | 175 | 7⅓ | 12 |
| 40 | do | 3.5 | Ex. 2 | 3.75 | | | | | 1 | 175 | 7½ | |
| 41 | do | 3.25 | Ex. 3 | 3.75 | | | | | 1 | 175 | 7½ | |
| 42 | do | 3.5 | Ex. 4 | 3.75 | | | | | 1 | 175 | 4½ | |
| 43 | Epon 1004 | 6.25 | Ex. 1 | 3.75 | | | | | 1 | 175 | 7½ | |
| 44 | do | 6.5 | Ex. 2 | 3.75 | | | | | 1 | 175 | 7½ | |
| 45 | do | 5.8 | Ex. 3 | 3.75 | | | | | 1 | 175 | 4½ | |
| 46 | do | 6.5 | Ex. 4 | 3.75 | | | | | 1 | 175 | (¹) | |
| 47 | Epon 1007 | 26 | Ex. 2 | 5 | | | | | .5 | 175 | (¹) | |
| 48 | do | 23 | Ex. 3 | 5 | | | | | .5 | 175 | (¹) | |
| 49 | Epon 1009 | 47 | Ex. 2 | 5 | | | | | .5 | 175 | (¹) | 60 |
| 50 | do | 42 | Ex. 3 | 5 | | | | | .5 | 175 | (¹) | 60 |
| 51 | Epon 864 | 10 | Ex. 2 | 10 | | | | | .5 | 175 | (²) | (²) |
| 52 | do | 9 | Ex. 3 | 10 | | | | | .5 | 175 | (²) | (²) |
| 53 | Epon 1009 | 31 | Ex. 10 | 5 | | | | | .5 | 175 | | |
| 54 | Ex. 15 | 3.6 | Ex. 1 | 5 | | | | | 1 | 175 | 7⅓ | |
| 55 | Ex. 15 | 3.7 | Ex. 2 | 5 | | | | | 1 | 175 | 1¼ | |
| 56 | Ex. 15 | 3.3 | Ex. 3 | 5 | | | | | 1 | 175 | 1¼ | |
| 57 | Ex. 16 | 10.5 | Ex. 1 | 10 | | | | | 1 | 175 | 8½ | |
| 58 | Ex. 16 | 10.9 | Ex. 2 | 10 | | | | | 1 | 175 | 8½ | |
| 59 | Ex. 16 | 9.7 | Ex. 3 | 10 | | | | | 1 | 175 | 8 | |
| 60 | Ex. 16 | 10.9 | Ex. 4 | 10 | | | | | 1 | 175 | 1½ | |
| 61 | Ex. 18 | 7.1 | Ex. 2 | 5 | | | | | .5 | 175 | 6 | ¾ |
| 62 | Ex. 18 | 6.2 | Ex. 3 | 5 | | | | | .5 | 175 | 6 | ¾ |
| 63 | Ex. 18 | 5 | Ex. 6 | 5 | | | | | .5 | 175 | 6 | ¾ |
| 64 | Ex. 18 | 5.7 | Ex. 2 | 5 | | | | | .5 | 175 | 6 | 1 |
| 65 | Ex. 19 | 8.1 | Ex. 2 | 5 | | | | | .5 | 175 | 6 | 1⅓ |
| 66 | Ex. 19 | 7.2 | Ex. 3 | 5 | | | | | .5 | 175 | 6 | ½ |
| 67 | Ex. 20 | 3.7 | Ex. 1 | 5 | | | | | 1 | 175 | 6½ | ½ |
| 68 | Ex. 20 | 3.9 | Ex. 2 | 5 | | | | | 1 | 175 | 6 | 1½ |
| 69 | Ex. 20 | 3.5 | Ex. 3 | 5 | | | | | 1 | 175 | 6 | ¼ |
| 70 | Ex. 20 | 3.9 | Ex. 4 | 5 | | | | | 1 | 175 | 6 | ¼ |
| 71 | Ex. 21 | 6.7 | Ex. 2 | 15 | | | | | .5 | 175 | 8 | ¾ |
| 72 | Ex. 21 | 6.0 | Ex. 3 | 15 | | | | | .5 | 175 | 8 | ¼ |
| 73 | Ex. 22 | 2.9 | Ex. 2 | 5 | | | | | .33 | 175 | 8 | ¼ |
| 74 | Ex. 22 | 2.6 | Ex. 3 | 5 | | | | | .33 | 175 | 8 | ½ |
| 75 | Epon 1004 | 11.7 | Ex. 3 | 5 | Ex. 25 | 1.7 | | | .5 | 175 | 5 | 200 |
| 76 | do | 13.0 | Ex. 4 | 5 | Ex. 25 | 1.8 | | | .5 | 175 | ¼ | 104 |
| 77 | Epon 1007 | 23.2 | Ex. 3 | 5 | Ex. 25 | 2.8 | | | .5 | 175 | ¼ | 200 |
| 78 | Epon 864 | 6.0 | Ex. 3 | 15 | Ex. 26 | 2.1 | | | .5 | 175 | ¼ | 4½ |
| 79 | Epon 1007 | 26.0 | Ex. 1 | 5 | Ex. 23 | 3.1 | | | .5 | 175 | ¼ | 144 |
| 80 | do | 14.2 | Ex. 5 | 5 | Ex. 23 | 1.9 | | | .5 | 175 | ¼ | 144 |
| 81 | Epon 864 | 10.0 | Ex. 1 | 10 | Ex. 24 | 2.0 | | | .5 | 175 | ¼ | 8 |
| 82 | do | 9.0 | Ex. 3 | 10 | Ex. 24 | 1.9 | | | .5 | 175 | ¼ | 8 |
| 83 | do | 10.0 | Ex. 1 | 10 | Ex. 27 | 4.0 | | | .5 | 175 | 8 | 1⅓ |
| 84 | Epon 1001 | 7.0 | Ex. 4 | 5 | Ex. 27 | 2.5 | | | .5 | 175 | ½ | 5½ |
| 85 | Epon 1009 | 9.0 | Ex. 3 | 0.5 | Ex. 34 | 0.5 | | | .5 | 175 | ¼ | 72 |
| 86 | Epon 864 | 0.6 | Ex. 3 | 9.0 | Ex. 25 | 0.4 | | | .5 | 175 | 3½ | ¼ |
| 87 | Ex. 16 | 5.5 | Ex. 1 | 5 | Ex. 25 | 3.2 | | | .5 | 175 | 7¾ | ¼ |
| 88 | Ex. 16 | 4.9 | Ex. 5 | 3 | Ex. 23 | 1.0 | | | .33 | 175 | 5½ | ¼ |
| 89 | Ex. 15 | 3.7 | Ex. 1 | 5 | Ex. 27 | 0.9 | | | .5 | 175 | 8 | ¼ |
| 90 | Ex. 15 | 3.7 | Ex. 1 | 5 | Ex. 25 | 0.9 | | | .33 | 175 | 8 | 2½ |
| 91 | Ex. 15 | 3.7 | Ex. 3 | 5 | Ex. 25 | 1.2 | | | .33 | 175 | 8 | 1 |
| 92 | Ex. 15 | 8.0 | Ex. 2 | 1.5 | Ex. 24 | 0.5 | | | .5 | 175 | 1 | 1½ |
| 93 | Ex. 16 | 1.0 | Ex. 4 | 8.0 | Ex. 25 | 1.0 | | | .5 | 175 | 3½ | ¼ |
| 94 | Ex. 16 | 2.5 | Ex. 2 | 2.5 | Ex. 25 | 5.0 | | | .5 | 175 | 3½ | ¼ |
| 95 | Ex. 18 | 5.0 | Ex. 5 | 5.0 | Ex. 23 | 2.0 | | | .5 | 175 | 7 | 3½ |
| 96 | Ex. 18 | 5.7 | Ex. 8 | 5.0 | Ex. 25 | 3.2 | | | .5 | 175 | 7 | 2 |
| 97 | Ex. 18 | 6.2 | Ex. 3 | 5.0 | Ex. 27 | 1.1 | | | .5 | 175 | 7 | ¼ |
| 98 | Ex. 20 | 3.5 | Ex. 3 | 5.0 | Ex. 24 | 1.3 | | | .5 | 175 | 7 | 2 |
| 99 | Ex. 18 | 8.0 | Ex. 2 | 0.5 | Ex. 24 | 1.5 | | | .5 | 175 | 1 | 3½ |
| 100 | Ex. 20 | 1.5 | Ex. 2 | 8.0 | Ex. 25 | 0.5 | | | .5 | 175 | 3½ | ¼ |
| 101 | Ex. 21 | 6.7 | Ex. 1 | 15.0 | Ex. 26 | 2.2 | | | .33 | 175 | 5 | 8 |
| 102 | Ex. 21 | 6.0 | Ex. 1 | 15.0 | Ex. 23 | 6.3 | | | .5 | 175 | 8 | 3½ |
| 103 | Ex. 22 | 2.6 | Ex. 3 | 5 | Ex. 23 | 1.5 | | | .5 | 175 | 8½ | 2 |
| 104 | Ex. 22 | 2.6 | Ex. 3 | 5 | Ex. 27 | 1.5 | | | .5 | 175 | 8 | ¼ |
| 105 | Ex. 21 | 6.0 | Ex. 3 | 15 | Ex. 24 | 2.1 | | | .5 | 175 | 11 | ¾ |
| 106 | Ex. 21 | 6.7 | Ex. 1 | 15 | Ex. 25 | 2.2 | | | .5 | 175 | 11 | 5 |
| 107 | Ex. 22 | 8.0 | Ex. 3 | 0.5 | Ex. 24 | 1.5 | | | .5 | 175 | 3½ | 3½ |
| 108 | Ex. 21 | 1.0 | Ex. 3 | 8.5 | Ex. 25 | 0.5 | | | .5 | 175 | 3½ | ¼ |
| 109 | Epon 1004 | 12.6 | Ex. 1 | 5 | Ex. 28 | 1.8 | | | .33 | 175 | ¼ | 56 |
| 110 | do | 13.0 | Ex. 2 | 5 | Ex. 30 | 1.8 | | | .33 | 175 | 5½ | 168 |
| 111 | Epon 1009 | 47.0 | Ex. 2 | 5 | Ex. 28 | 5.2 | | | .33 | 175 | ¼ | 200 |
| 112 | do | 42.0 | Ex. 2 | 5 | Ex. 30 | 4.7 | | | .33 | 175 | ¼ | 144 |
| 113 | Epon 864 | 10.0 | Ex. 2 | 10 | Ex. 29 | 4.0 | | | .5 | 175 | 8 | 128 |
| 114 | Epon 1009 | 9.0 | Ex. 1 | 0.5 | Ex. 29 | 0.5 | | | .5 | 175 | ¼ | 8 |
| 115 | Epon 864 | 0.6 | Ex. 2 | 0.4 | Ex. 29 | 9.0 | | | .5 | 175 | ¼ | ¼ |
| 116 | do | 0.5 | Ex. 2 | 9.0 | Ex. 28 | 0.5 | | | .5 | 175 | 3 | 3 |
| 117 | do | 2.5 | Ex. 2 | 5.0 | Ex. 28 | 2.5 | | | .5 | 175 | 3 | 8 |
| 118 | Ex. 15 | 3.7 | Es. 2 | 5.0 | Ex. 29 | 0.9 | | | .33 | 175 | 8 | 1 |
| 119 | Ex. 15 | 3.7 | Ex. 2 | 5.0 | Ex. 30 | 0.9 | | | .33 | 175 | 8 | 1½ |
| 120 | Ex. 15 | 3.7 | Ex. 2 | 5 | Ex. 28 | 0.9 | | | .33 | 175 | 8 | ¼ |
| 121 | Ex. 16 | 5.4 | Ex. 4 | 5 | Ex. 30 | 2.1 | | | .5 | 175 | 8½ | 3½ |

| Ex. No. | Polyepoxide | Parts | Polycar- boxylic acids | Parts | Aldehyde con- densate | Parts | Catalyst | | Conversion | | Film resistance | |
|---|---|---|---|---|---|---|---|---|---|---|---|---|
| | | | | | | | Type | Parts | Time (hrs.) | Temp. (° C.) | $H_2O$ at (100° C.), hr. | Hours 5% aqueous NaOH (at 25° C.), hr. |
| 122 | Ex. 15 | 8.0 | Ex. 2 | 1.5 | Ex. 28 | 0.5 | $BF_3-Et_2O$ | 0.03 | .5 | 175 | 3 | ¼ |
| 123 | Ex. 16 | 1.0 | Ex. 4 | 8.0 | Ex. 29 | 1.0 | $BF_3-Et_2O$ | 0.03 | .5 | 175 | ¼ | ¼ |
| 124 | Ex. 15 | 1.5 | Ex. 2 | 0.5 | Ex. 29 | 8.0 | | | .5 | 175 | 3 | 3 |
| 125 | Ex. 16 | 2.5 | Ex. 2 | 2.5 | Ex. 29 | 5.0 | | | .5 | 175 | 3 | 3 |
| 126 | Ex. 20 | 3.7 | Ex. 1 | 5 | Ex. 28 | 0.9 | | | .33 | 175 | 5 | ½ |
| 127 | Ex. 20 | 3.9 | Ex. 4 | 5 | Ex. 30 | 0.9 | | | .33 | 175 | 5 | ¼ |
| 128 | Ex. 19 | 8.1 | Ex. 2 | 5 | Ex. 28 | 1.3 | $BF_3-Et_2O$ | 0.03 | .5 | 175 | 7 | 2¾ |
| 129 | Ex. 18 | 7.1 | Ex. 2 | 5 | Ex. 30 | 1.2 | $BF_3-Et_2O$ | 0.03 | .5 | 175 | 7 | 2 |
| 130 | Ex. 18 | 6.2 | Ex. 3 | 5 | Ex. 29 | 1.7 | | | .5 | 175 | 7 | 8½ |
| 131 | Ex. 18 | 8.0 | Ex. 2 | 0.5 | Ex. 28 | 1.5 | $BF_3-Et_2O$ | 0.03 | .5 | 175 | 3 | ½ |
| 132 | Ex. 20 | 1.5 | Ex. 3 | 8.0 | Ex. 29 | 0.5 | | | .5 | 175 | ½ | ¼ |
| 133 | Ex. 20 | 1.0 | Ex. 3 | 1.0 | Ex. 29 | 8.0 | | | .5 | 175 | 3 | 3 |
| 134 | Ex. 20 | 2.0 | Ex. 3 | 3.0 | Ex. 29 | 5.0 | | | .5 | 175 | 3 | 2 |
| 135 | Ex. 21 | 6.0 | Ex. 3 | 15.0 | Ex. 29 | 2.1 | | | .5 | 175 | 8 | ¼ |
| 136 | Ex. 21 | 6.7 | Ex. 1 | 15.0 | Ex. 28 | 4.3 | | | .5 | 175 | 8 | ½ |
| 137 | Ex. 22 | 2.9 | Ex. 1 | 5 | Ex. 30 | 0.8 | | | .5 | 175 | 8 | 3½ |
| 138 | Ex. 22 | 8.0 | Ex. 1 | 0.5 | Ex. 28 | 1.5 | | | .5 | 175 | 3 | 3 |
| 139 | Ex. 21 | 0.5 | Ex. 3 | 0.5 | Ex. 29 | 9.0 | | | .5 | 175 | 3½ | 3 |
| 140 | Ex. 21 | 2.0 | Ex. 3 | 3.5 | Ex. 29 | 4.5 | | | .5 | 175 | 3 | 8 |

1 Slightly whitened in boiling water.
2 Hard, flexible, insoluble and infusible films.

Examples 141 to 166 inclusive demonstrate further embodiments of the instant invention.

EXAMPLE 141

A mixture of 15 parts of the polycarboxylic acid of Example 2 and 21 parts of Epon 1001 were melted together and poured into a molding unit, a spherical chamber of 1½" diameter, and the molding unit then heated for 1 hour at 150° C., and 1¾ hours at 175° C., resulting in an insoluble, infusible molded object exhibiting marked flexibility as shown by its resistance to impact.

EXAMPLE 142

A mixture of 6.5 parts of Epon 1001 and 5 parts of the polycarboxylic acid of Example 3 was melted together and cured in ½" layers for a period of 2 hours at 175° C. to give an insoluble, infusible converted object of unusually high structural strength.

EXAMPLE 143

A mixture of 1.8 parts of butylene dioxide and 15 parts of the polycarboxylic acid of Example 2 placed in an aluminum container to form a layer of about ½ inch thickness and heat treated for ½ hour at 150° C. and 2 hours at 170° C., gave an infusible, insoluble product which was tack free at 170° C. This conversion illustrates the fact that these compositions can be converted in thick layers comparable to that which would be used in the preparation of molded objects.

EXAMPLE 144

A mixture of 2.6 parts of bis(2,3-epoxy propyl) ether and 15 parts of the polycarboxylic acid of Example 3 was placed in an aluminum container in layer thicknesses of ½ inch. This product was heat treated for ½ hour at 150° C. and 2 hours at 170° C. to give an infusible, insoluble product which was tack free at 170° C.

EXAMPLE 145

A mixture was prepared containing 0.5 part of Epon 864, 0.5 part of polycarboxylic acid of Example 2 and 9 parts of the aldehyde condensate of Example 25. The mixture was spread in wet films of 0.002" thickness and cured by baking for 30 minutes at 175° C. The films thus cured were very hard, tack-free and resistant to boiling water for 6 hours and to 5% aqueous NaOH for 5 hours.

EXAMPLE 146

A reaction mixture was prepared by admixing 2.5 parts of Epon 864, 2.5 parts of the polycarboxylic acid of Example 2 and 5 parts of the aldehyde condensate of Example 25. This mixture was spread in wet films of 0.002" thickness and cured at 175° C. for 30 minutes. The cured films were hard, tack-free and withstood boiling water for 6 hours and 5% aqueous NaOH for 8 hours.

EXAMPLE 147

A mixture was prepared containing 1 part of the epoxide of Example 20, 1 part of the polycarboxylic acid of Example 3 and 8 parts of the aldehyde condensate of Example 25. The mixture was spread in wet films of 0.002" thickness and cured by baking for 30 minutes at 175° C. The films thus cured were very hard, tack-free and resistant to boiling water for 2 hours and to 5% aqueous NaOH for 30 hours.

EXAMPLE 148

A reaction mixture was prepared by admixing 2 parts of the epoxide of Example 20, 3 parts of the polycarboxylic acid of Example 3 and 5 parts of the aldehyde condensate of Example 25. This mixture was spread in wet films of 0.002" thickness and cured at 175° C. for 30 minutes. The cured films were hard, tack-free and withstood boiling water for 2 hours and 5% aqueous NaOH for 1½ hours.

EXAMPLE 149

A mixture was prepared containing 0.5 part of the polyepoxide of Example 21, 0.5 part of the polycarboxylic acid of Example 3, and 9 parts of the aldehyde condensate of Example 24. This mixture was spread in wet films of .002" thickness and cured at 175° C. for 30 minutes. The cured films were hard, tack-free and withstood boiling water for 2 hours and 5% aqueous NaOH for 1½ hours.

EXAMPLE 150

A reaction mixture was prepared by admixing 2 parts of the polyepoxide of Example 21, 3.5 parts of the polycarboxylic acid of Example 3 and 4.5 parts of the aldehyde condensate of Example 25. This mixture was spread in wet films of .002" thickness and cured at 175° C. for 30 minutes. The cured films were hard, tack-free, and withstood boiling water for 3½ hours and 5% aqueous NaOH for 3 hours.

EXAMPLE 151

A mixture of 15 parts of the resinous polycarboxylic acid of Example 1, 3.2 parts of the phenol-aldehyde condensate of Example 29, and 1.8 parts of butylene dioxide, all ingredients free of solvent, was cast in a ½" mold and heat-cured for 25 minutes at 175° C. to give a hard, tack-free, infusible, insoluble object.

EXAMPLE 152

A mixture of 15 parts of the resinous polycarboxylic acid of Example 3, 3.3 parts of the phenol-aldehyde condensate of Example 29 and 2.6 parts of bis(2,3-epoxypropyl) ether was cast in a ½" mold and heated at 175° C. for a period of 25 minutes to give a hard, insoluble, infusible object. This product was free from hot tack.

EXAMPLE 153

A mixture of 10 parts Epon 1001 and 10 parts of the polycarboxylic acid of Example 13 was placed in a ½" deep flat mold and heated for ½ hour at 175° C. to give a tack-free, flexible, infusible and insoluble material.

EXAMPLE 154

A mixture of 20 parts of Epon 1004 and 10 parts of the polycarboxylic acid of Example 13 gave a flexible, insoluble and infusible product when heat cured for ½ hour at 150° C.

EXAMPLE 155

A mixture of 10 parts of Epon 1001, 10 parts of the polycarboxylic acid of Example 13 and 5 parts of the aldehyde condensate of Example 29 was heat converted for ½ hour at 175° C. in a ½" deep aluminum container to give an infusible, insoluble product having good toughness and flexibility.

EXAMPLE 156

A reaction mixture was prepared containing 20 parts of Epon 1001, 10 parts of the polycarboxylic acid of Example 12 and 0.1 part of boron trifluoride ethyl-ether adduct. The mixture was cast in a flat mold of ½" thickness and cured by baking for ½ hour at 150° C. The resultant material was hard and infusible.

EXAMPLE 157

A mixture of 10 parts of Epon 1001, 20 parts of the polycarboxylic acid of Example 12 and 0.1 part of boron trifluoride ethyl-ether adduct, placed in a mold to form a layer of about ½" thickness, and heat treated for 1 hour at 150° C. gave a hard, infusible, insoluble product.

EXAMPLE 158

A mixture of 10 parts of the polycarboxylic acid of Example 12, 10 parts of Epon 1004 and 10 parts of the aldehyde condensate of Example 29, when heated in a mold of about ½" thickness for ½ hour at 150° C., gave an insoluble, infusible product.

EXAMPLE 159

A mixture was prepared containing 20 parts of the polycarboxylic acid of Example 12, 10 parts of Epon 1001 and 10 parts of the aldehyde condensate of Example 26. The mixture was cast in a flat mold of about ½" thickness and cured by baking for 30 minutes at 150° C. The resultant material was hard, tack-free and very tough.

EXAMPLE 160

A mixture of 30 parts of Epon 1001 and 30 parts of a polycarboxylic acid of Example 11 placed in a mold of about ½" thickness and heat converted for one hour at 175° C. gave a hard insoluble and infusible product which was tack-free.

EXAMPLE 161

A mixture of 30 parts of the polycarboxylic acid of Example 11 and 10 parts of Epon 1004 was heat converted for one hour at 175° C. in a flat metal mold. The resultant object was hard, insoluble, infusible and completely tack-free.

EXAMPLE 162

A reaction mixture was prepared by admixing 15 parts of the polycarboxylic acid of Example 11, 30 parts of Epon 1001 and 30 parts of the aldehyde condensate of Example 29. The mixture was cast in a metal mold of about ½" thickness and cured for one hour at 175° C. The resultant object was hard and completely tack-free.

EXAMPLE 163

A mixture of 30 parts of the polycarboxylic acid of Example 11, 30 parts of Epon 1001 and 10 parts of the aldehyde condensate of Example 26 was placed in a ½" deep metal mold. The mixture was heat treated for one hour at 175° C. to give an infusible insoluble product.

EXAMPLE 164

A mixture of 20 parts of Epon 1001 and 15 parts of the polycarboxylic acid of Example 14 was placed in a metal mold of about ½" thickness. The mixture was heat treated for one hour at 175° C. to give a hard, insoluble and infusible product.

EXAMPLE 165

A reaction mixture was prepared by admixing 20 parts of Epon 1001, 20 parts of the polycarboxylic acid of Example 14 and 15 parts of the aldehyde condensate of Example 29. The mixture was cast in a metal mold of about ½" thickness and cured for 1 hour at 200° C. to give a hard insoluble, infusible product.

EXAMPLE 166

A reaction mixture was prepared containing 10 parts of Epon 1001, 15 parts of polycarboxylic acid of Example 14 and 20 parts of the aldehyde condensate of Example 24. The mixture was cast in a metal mold of about ½" thickness and cured by baking for 1 hour at 175° C. The resultant object was hard and tack-free.

It should be appreciated that the invention is not to be construed to be limited by the illustration examples. It is possible to produce still other embodiments without departing from the inventive concept herein disclosed. This application is a continuation-in-part of the Greenlee copending applications Serial Nos. 538,247, 549,510 and 561,655 filed October 3, 1955, November 28, 1955, and January 26, 1956, respectively, now abandoned.

It is claimed and desired to secure by Letters Patent:

1. A composition of matter comprising the condensation product obtained by heating (A) an organic polyepoxide having an average of more than one epoxide group per molecule wherein the epoxy oxygen is linked to adjacent carbon atoms and (B) a polycarboxylic ether acid comprising the condensation product of (1) a 4,4 bis(hydroxyaryl)pentanoic acid wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituents on the hydroxyphenyl being a member selected from the group consisting of chloro, bromo, nitro and alkyl groups of from 1–5 carbon atoms and (2) a coupling agent having a total of from 2–10 carbon atoms and having the structural formula X—A—X wherein X is a member of the group consisting of halogen atoms and oxirane groups and A is a divalent radical selected from the group consisting of alkylene, hydroxyalkylene, dialkylene ether, vinylene and mixtures thereof.

2. A composition of matter comprising the condensation product obtained by heating (A) an organic polyepoxide having an average of more than one epoxide group per molecule wherein the epoxy oxygen is linked to adjacent carbon atoms, (B) a polycarboxylic ether acid comprising the condensation product of (1) a 4,4 bis(hydroxyaryl)pentanoic acid wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituents on the hydroxyphenyl being a member selected from the group consisting of chloro, bromo, nitro and alkyl groups of from 1-5 carbon atoms and (2) a coupling agent having a total of from 2-10 carbon atoms and having the structural formula X—A—X wherein X is a member of the group consisting of halogen atoms and oxirane groups and A is a divalent radical selected from the group consisting of alkylene, hydroxyalkylene, dialkylene ether, vinylene and mixtures thereof, and (C) a fusible condensate of a mono-aldehyde with at least one organic ammonia derivative selected from the group consisting of urea, thiourea, melamine, toluene sulfonamide and alkyl substituted derivatives thereof.

3. A composition of matter comprising the condensation product obtained by heating (A) an organic polyepoxide having an average of more than one epoxide group per molecule wherein the epoxy oxygen is linked to adjacent carbon atoms, (B) a polycarboxylic ether acid comprising the condensation product of (1) a 4,4 bis(hydroxyaryl)pentanoic acid wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituents on the hydroxyphenyl being a member selected from the group consisting of chloro, bromo, nitro and alkyl groups of from 1-5 carbon atoms and (2) a coupling agent having a total of from 2-10 carbon atoms and having the structural formula X—A—X wherein X is a member of the group consisting of halogen atoms and oxirane groups and A is a divalent radical selected from the group consisting of alkylene, hydroxyalkylene, dialkylene ether, vinylene and mixtures thereof, and (C) a fusible condensate of a mono-aldehyde with a phenol.

4. A composition of claim 1 wherein the pentanoic acid is 4,4-bis(4-hydroxyphenyl) pentanoic acid.

5. A composition of claim 1 wherein the hydroxyaryl radical of the pentanoic acid is alkyl substituted.

6. The composition of claim 1 wherein said polyepoxide (A) is a complex epoxide which is a polymeric polyhydric alcohol having alternating aliphatic chains and aromatic nuclei united through ether oxygen and terminating in epoxy-substituted aliphatic chains.

7. The composition of matter of claim 1 wherein said polyepoxide (A) is an epoxidized ester of an unsaturated natural fatty oil acid containing about 15-22 carbon atoms, and having its reactive groups selected from the class consisting of epoxy and hydroxy.

8. The composition of matter of claim 1 wherein said polyepoxide (A) is an aliphatic polyepoxide selected from the group consisting of bis(glycidyloxy) butene, triglycidyl glyceryl ether, diepoxy butane, and diglycide ether.

No references cited.

UNITED STATES PATENT OFFICE
CERTIFICATE OF CORRECTION

Patent No. 2,907,732                                                                October 6, 1959

Sylvan Owen Greenlee

It is hereby certified that error appears in the printed specification of the above numbered patent requiring correction and that the said Letters Patent should read as corrected below.

Column 1, line 30, for "intermedaite" read -- intermediate --; column 3, lines 6 and 7, for "diphenolic acid" read -- Diphenolic Acid --; column 5, line 68, for "mxrture" mread -- mixture --; column 6, lines 36 and 37, for "diphenolic acid" read -- Diphenolic Acid --; column 8, lines 38 and 39, for "4,4-bis(4-hydroxy-3-nitro nitro phenyl)-pentanoic acid" read -- 4,4-bis(4-hydroxy-3-nitro phenyl)-pentanoic acid, 4,4-bis(4-hydroxy-3,5-dinitro phenyl)-pentanoic acid --; column 10, line 60, after "oil" insert -- acid --; column 15, line 3, for "end" read -- and --; line 44, for "monoculear" read -- mononuclear --; column 16, line 20, for "expoxide" read -- epoxide --; columns 21 and 22, in the table, twelfth column thereof, under the heading "$H_2O$ at (100° C.), hr." and opposite "Ex. No. 57 and 58", for "$8\frac{1}{2}$", each occurrence, read -- 8 --; same table, same twelfth column thereof, opposite "Ex. No. 67", for "$6\frac{1}{2}$" read -- 6 --; same table, same twelfth column thereof, opposite "Ex. No. 84", for "$\frac{1}{2}$" read -- 1/12 --; same table, sixth column thereof, under the heading "Aldehyde condensate" and opposite "Ex. No. 85", for "Ex. 34" read -- Ex. 24 --; same table, twelfth column thereof, under the heading "$H_2O$ at (100° C.), hr." and opposite "Ex. No. 88", for "$5\frac{1}{2}$" read -- 5 --; same table, same twelfth column thereof, opposite "Ex. No. 103", for "$8\frac{1}{2}$" read -- 8 --; same table, same twelfth column thereof, opposite "Ex. No. 121", for "$8\frac{1}{2}$" read -- 8 --; columns 23 and 24, in the table, twelfth column thereof, under the heading "$H_2O$ at (100° C.), hr." and opposite "Ex. No. 139", for "$3\frac{1}{2}$" read -- 3 --.

Signed and sealed this 31st day of May 1960.

(SEAL)
Attest:

KARL H. AXLINE                                                   ROBERT C. WATSON
Attesting Officer                                        Commissioner of Patents